United States Patent [19]

Fukuda et al.

[11] Patent Number: 5,156,082
[45] Date of Patent: Oct. 20, 1992

[54] AUTOMATIC RICE COOKER

[75] Inventors: Toshimasa Fukuda; Mitsuo Miyabe; Isao Hamada; Hiroyoshi Nakagawa; Takeshi Yamaoka; Takahisa Yamaguchi; Mikio Ando; Fujio Sakaguchi, all of Tottori, Japan

[73] Assignee: Sanyo Electric Co., Ltd., Tottori, Japan

[21] Appl. No.: 573,488

[22] Filed: Aug. 27, 1990

[30] Foreign Application Priority Data

Sep. 1, 1989 [JP] Japan .................................. 1-227890
Sep. 1, 1989 [JP] Japan .................................. 1-227892

[51] Int. Cl.$^5$ ......................... A23L 37/10; A47J 37/12
[52] U.S. Cl. ...................................... 99/326; 99/352; 99/403; 99/407
[58] Field of Search ...................... 99/326, 327, 329 R, 99/331, 330, 352, 355, 407, 403, 410, 333, 483, 451, 484, 486, 334, 367; 126/374, 373; 366/141, 181

[56] References Cited

U.S. PATENT DOCUMENTS

| 4,307,287 | 12/1981 | Weiss | 99/333 |
| 4,649,810 | 3/1987 | Wong | 99/326 |

FOREIGN PATENT DOCUMENTS

| 0105723 | 6/1983 | Japan . | |
| 0105724 | 6/1983 | Japan . | |
| 0105725 | 6/1983 | Japan . | |
| 0105730 | 6/1983 | Japan . | |
| 0177620 | 10/1984 | Japan . | |
| 0181113 | 10/1984 | Japan | 99/403 |

Primary Examiner—Philip R. Coe
Assistant Examiner—Tony Soohoo
Attorney, Agent, or Firm—Morrison Law Firm

[57] ABSTRACT

A rice cooker includes an interlock that prevents the user from sliding the cooking pot out of the cooker without first disengaging internal assemblies that would otherwise be damaged. The rice cooker operates in any of three user selectable modes: a fully automatic mode in which the rice cooker measures out a user selected quantity of internally stored raw, unwashed rice, washes the rice, cooks the rice and then keeps the rice warm; a cook and keep-warm in which the cooking pot of the rice cooker is loaded with premeasured and washed rice from an external source and the rice cooker cooks the rice and keeps it rice warm; and a rice warming mode in which the cooking pot is loaded with already cooked rice and maintains it at a serving temperature. A startup routine checks that a pot is installed, that a lid is on the pot, that an upper pot cover assembly is at a required height, that a platform is in its latched position, and that a washer container is in its stowed position. If any check fails, an alarm sounds, and/or further operation is prevented.

6 Claims, 10 Drawing Sheets

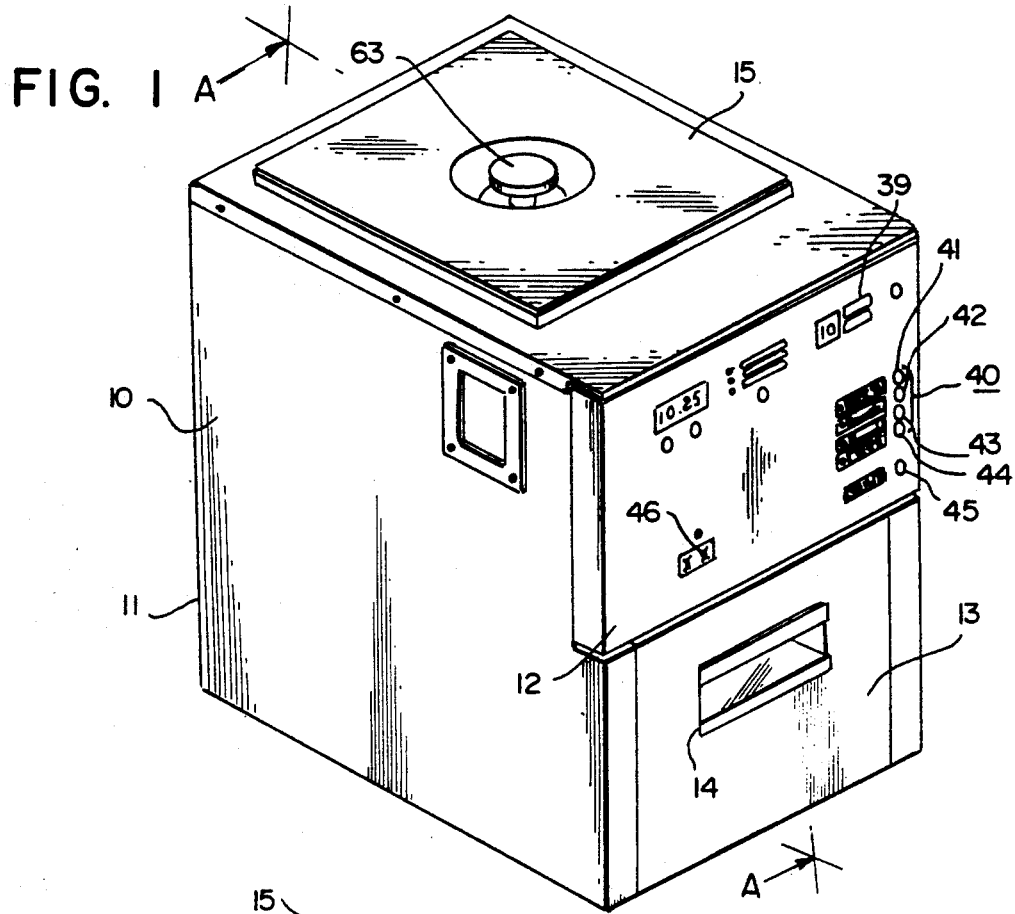

INITIAL SETUP ROUTINE

AUTOMATIC RICE COOKER

BACKGROUND OF THE INVENTION

The present invention relates to rice cookers and, more particularly, to an automatic rice cooker for washing, cooking and keeping warm selected quantities of rice.

Conventional rice cookers such as disclosed, for example, in Japanese Laid-open Patent Publication 58-105724, and Japanese Examined Patent Publication 1-16168, automatically weigh, wash and cook rice. However, these prior-art devices do not provide automatic modes for cooking rice that is washed elsewhere, or for keeping warm rice that is washed and cooked elsewhere.

In addition, the above prior-art rice cookers permit premature withdrawal of a rice cooking pot at times that may damage the pot or the remainder of the rice.

Also, the prior-art devices fail to provide for a checkout and setup routine which checks for the existence of conditions required for the beginning or continuation of operation.

OBJECTS AND SUMMARY OF THE INVENTION

Accordingly, it is an object of the present invention to provide a rice cooker which overcomes the drawbacks of the prior art.

It is further object of the invention to provide a rice cooker that is capable of cooking and keeping rice warm that is measured and washed elsewhere, as well as to rewarm precooked rice.

It is still further object of the invention to provide improved means to remove and replace the pot body from a rice cooker without damage.

Briefly stated, the present invention provides a rice cooker having an interlock that prevents the user from sliding the cooking pot out of the cooker without first disengaging internal assemblies that would otherwise be damaged. The rice cooker operates in any of three user selectable modes: a fully automatic mode in which the rice cooker measures out a user selected quantity of internally stored raw, unwashed rice, washes the rice, cooks the rice and then keeps the rice warm; a cook and keep-warm mode in which the cooking pot of the rice cooker is loaded with premeasured and washed rice from an external source and the rice cooker cooks the rice and keeps it rice warm; and keep-warm mode in which the cooking pot is loaded with already cooked rice which it then maintains heated to a serving temperature. A startup routine checks that a pot is installed, that a lid is on the pot, that an upper pot cover assembly is at a required height, and that a washer container is in its stowed position. If any check fails, an alarm sounds, and/or further operation is prevented.

According to an embodiment of the invention, there is provided a rice cooker comprising: means for weighing a predetermined quantity of rice, means for washing the predetermined quantity of rice to produce washed rice, means for cooking the washed rice, means for keeping rice warm, automatic means for operating the means for weighing, means for washing and the means for cooking, means for bypassing the means for weighing and the means for washing, whereby rice that has been washed elsewhere can be cooked, and means for bypassing the means for weighing, the means for washing, and the means for cooking, whereby rice that has been washed and cooked elsewhere can be kept warm.

According to a feature of the invention, there is provided a method for treating rice comprising: weighing a predetermined quantity of rice, washing the predetermined quantity of rice to produce washed rice, cooking the washed rice, keeping rice warm, automatically operating the means for weighing, means for washing and the means for cooking, selectively bypassing the weighing and the washing, whereby rice that has been washed elsewhere can be cooked, and selectively bypassing the weighing, washing, and the cooking, whereby rice that has been washed and cooked elsewhere can be kept warm.

According to a further feature of the invention, there is provided an automatic rice cooker comprising: a cooking pot assembly, the cooking pot assembly including a removable pot and at least one cover therefor, a slidable platform, the slidable platform including means for accepting the cooking pot assembly at a first pot position outside the rice cooker assembly, and for sliding the cooking pot assembly into a second pot position in the rice cooker, means for latching the slidable platform in the second pot position, an upper pot cover assembly, the upper pot cover assembly being aligned over the cooking pot assembly when the cooking pot assembly is in the second pot position, means for moving the upper pot cover assembly between first, second and third positions, the first position being an elevated position clear of the cooking pot assembly, the second position an extreme lower position in which the upper pot cover assembly is urged into sealing contact with the cooking pot assembly, the third position being intermediate the first and second positions, engaging means movable with the upper pot cover assembly, for engaging the at least one cover when the cooking pot assembly is moved into the second pot position while the upper pot cover assembly is in its third position, the engaging means being further effective for releasing the at least one cover when the cooking pot assembly is moved from the second pot position to the first pot position, the engaging means being further effective for raising the at least one cover clear of the cooking pot assembly when the upper pot cover assembly is moved from its third position to its first position, means for moving the removable pot from the second pot position to a third pot position when the upper pot cover assembly is in the first position, and means for dispensing a predetermined quantity of rice to the removable pot when the removable pot is in the the third pot position.

According to a still further feature of the invention, there is provided, an automatic rice cooker comprising: a slidable platform having first and second sliding positions, means for permitting installation of a cooking pot assembly on the slidable platform at a first pot position outside the rice cooker, means for sliding the slidable platform to a second pot position inside the rice cooker, means for latching the slidable platform in the second pot position, an upper cover assembly aligned over the second pot position, the upper cover assembly including at least first and second positions, the first position being a loading and unloading position at which sliding of the slidable platform between the first and second pot positions should be permitted, the second position being a position at which sliding the slidable platform between the first and second positions should be prevented, and means for retaining the means for latching in its latching position at all times except when the upper cover assembly is in the first position.

The above and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a perspective view of the rice cooker according to an embodiment of the invention.

FIG. 2 is a cross section taken along A—A FIG. 1.

DETAILED DESCRIPTION OF THE PREFERRED EMBODIMENT

Figure 3:
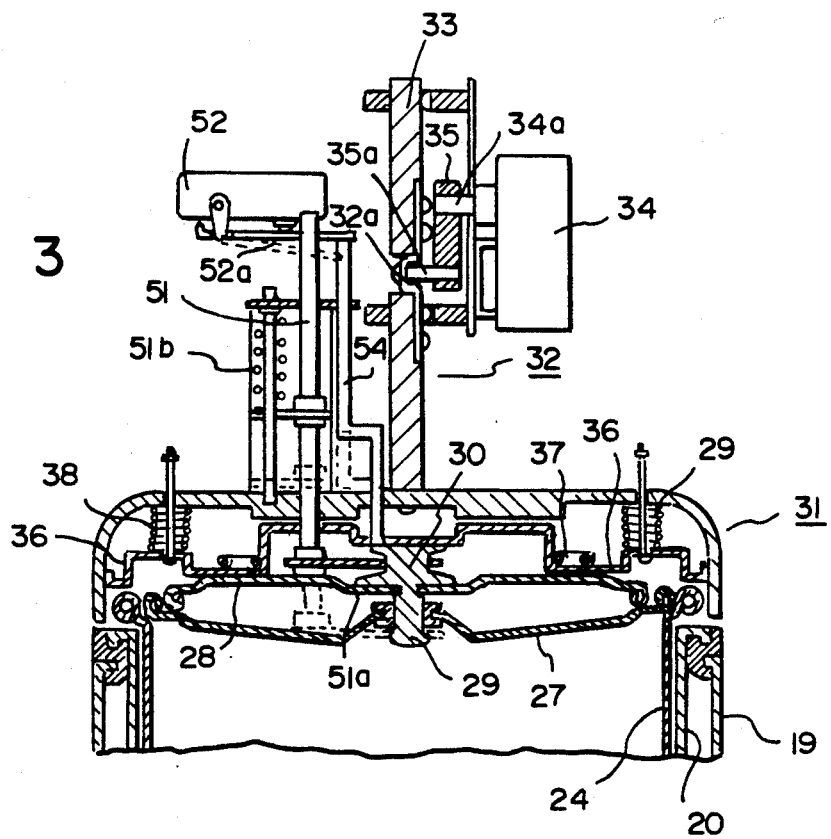
FIG. 3 is an enlarged fragmentary cross section showing the pot cover assembly in a closed position.

Referring to FIG. 1, rice cooker 10 includes enclosure 11 having control panel 12 with all of the various switches necessary to control the operation of rice cooker 10. These switches include an on/off switch 46, to apply power to the rice cooker; a set of mode select buttons 40 including an automatic mode button 41, a cook and keep-warm button 42, a warm button 43 and a cancel button 44 to select the operating mode of the rice cooker; quantity setting controls 39, to set in the quantities of rice to be cooked; and a release button 45, to unlatch access to the cooking apparatus within rice cooker 10.

A drawer panel 13, disposed on the lower front of rice cooker 10, is pulled open using a drawer pull 14, for access to the internal rice cooking assemblies. A cover 15 with attached knob 63 is disposed on the top of rice cooker 10. Cover 15 is removed when raw rice is loaded into rice cooker 10 for storage.

Referring now to FIG. 2, tracks 16 are disposed along the bottom of the rice cooker enclosure 11. A platform 17 is slidably mounted on tracks 16. Platform 17 is attached at its front to the drawer panel 13. A cooking pot assembly 18 is mounted on sliding platform 17 so that it may be moved in and out of rice cooker 10 on the platform 17. A solenoid releasable latch, made up of solenoid 48, latch hook 49, and drawer sensing switch 47 is disposed at the lower rear of rice cooker 10.

Figure 8:
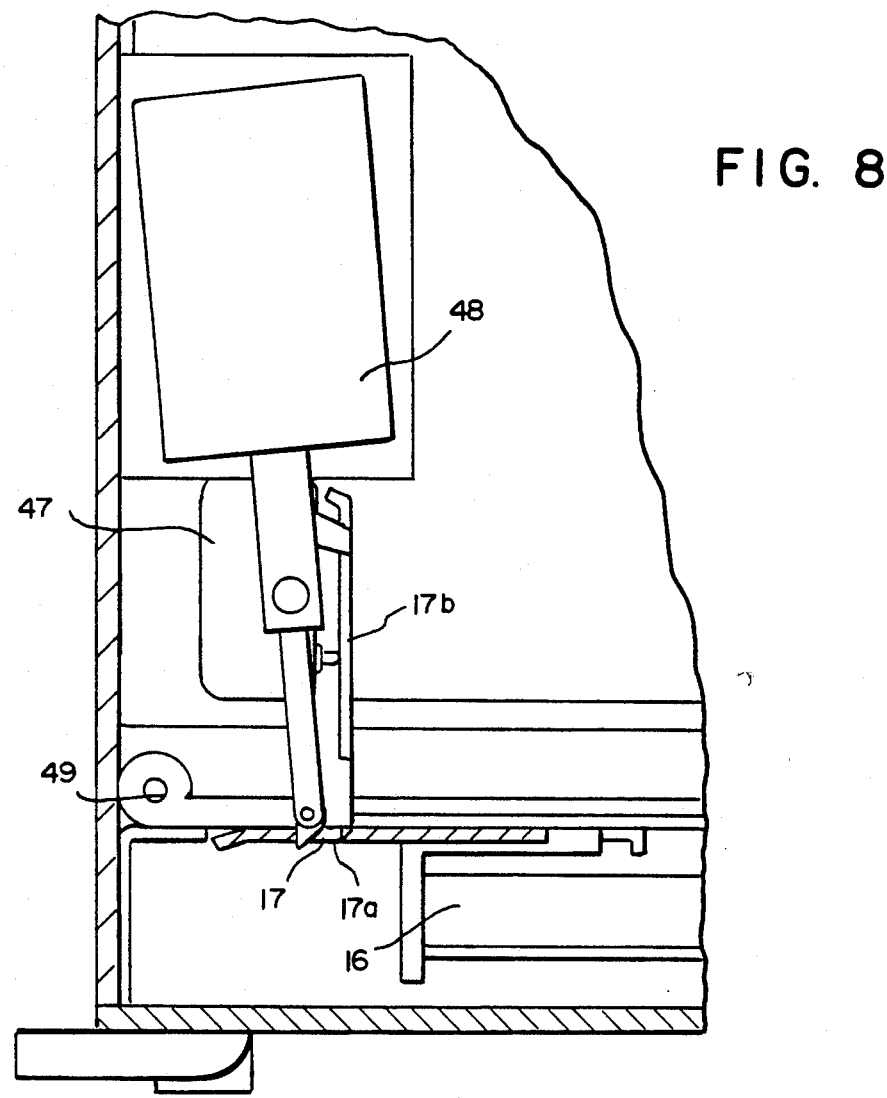
FIG. 8 is an enlarged fragmentary cross section of the pot unlocking assembly of the invention.

Referring momentarily to FIG. 8, when sliding platform 17 is pushed fully into rice cooker 10, latch hook 49 drops into an opening 17a on platform 17, locking it in place. A projection 17b projecting upward from platform 17 closes drawer sensing switch 47. The cooking process cannot be started if drawer sensing switch 47 is open.

Returning now to FIG. 2, a cooking pot assembly 18 includes an outer frame 19 and a pot holding assembly 20. A removable pot 24, in which the actual cooking is accomplished, is inserted into cooking pot assembly 18.

A spring loaded pot sensor 21 detects the presence of removable pot 24 by yielding under its weight. A heat plate 22 in pot holding assembly 20 contacts the bottom of removable pot 24 to heat the contents thereof. Heat for cooking and warming is applied to heat plate 22 by heating element 23, which is coiled through the fabric of heat plate 22.

Figure 5:
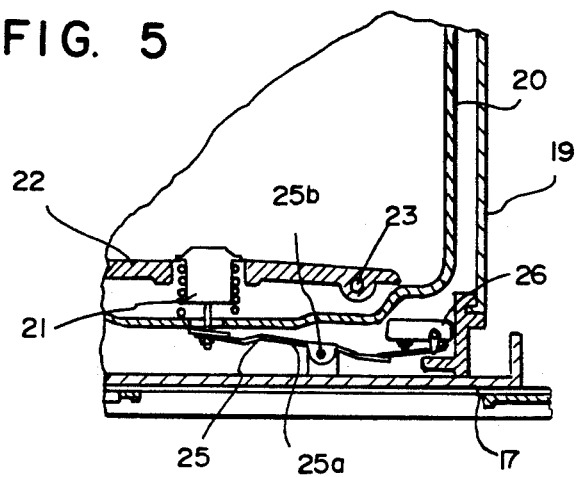
FIG. 5 is an enlarged fragmentary detail of the pot detecting assembly of the invention.
Figure 7:
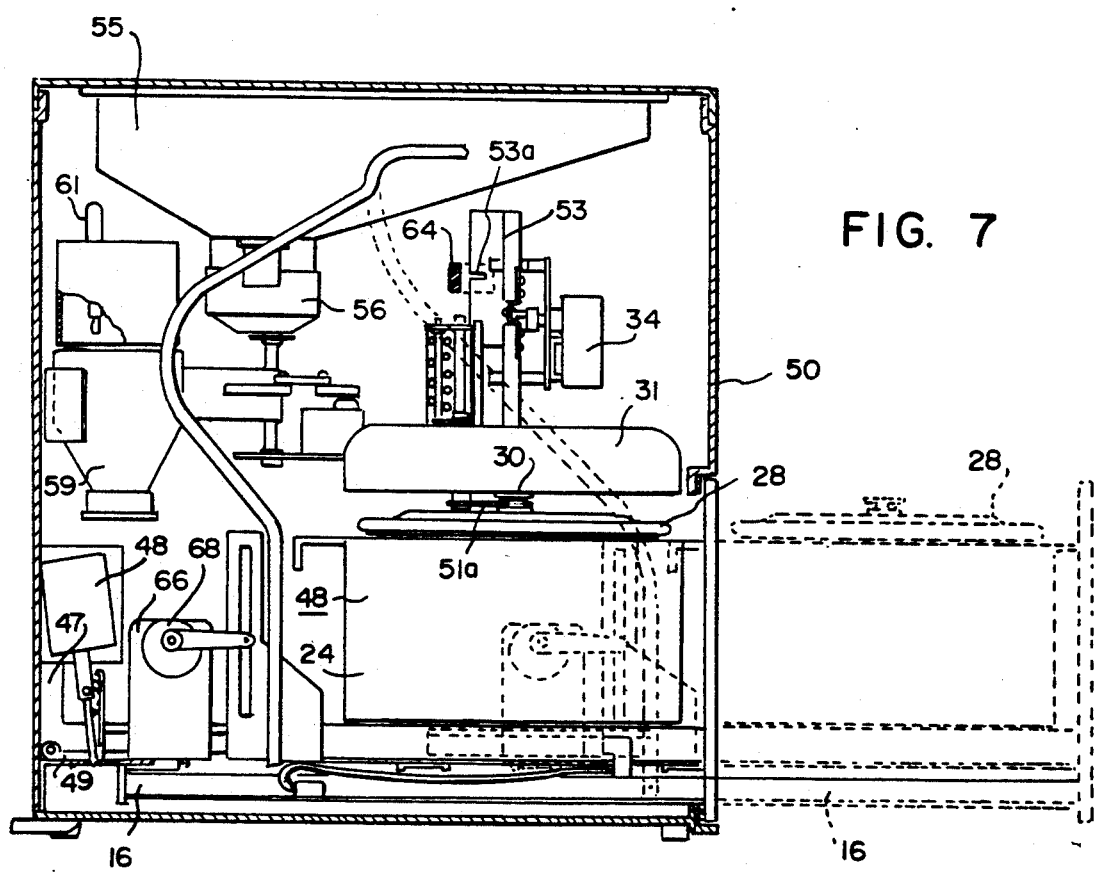
FIG. 7 is a cross section of the rice cooker showing the pot assembly and platform in the operating and pulled-out positions.
Figure 6A:
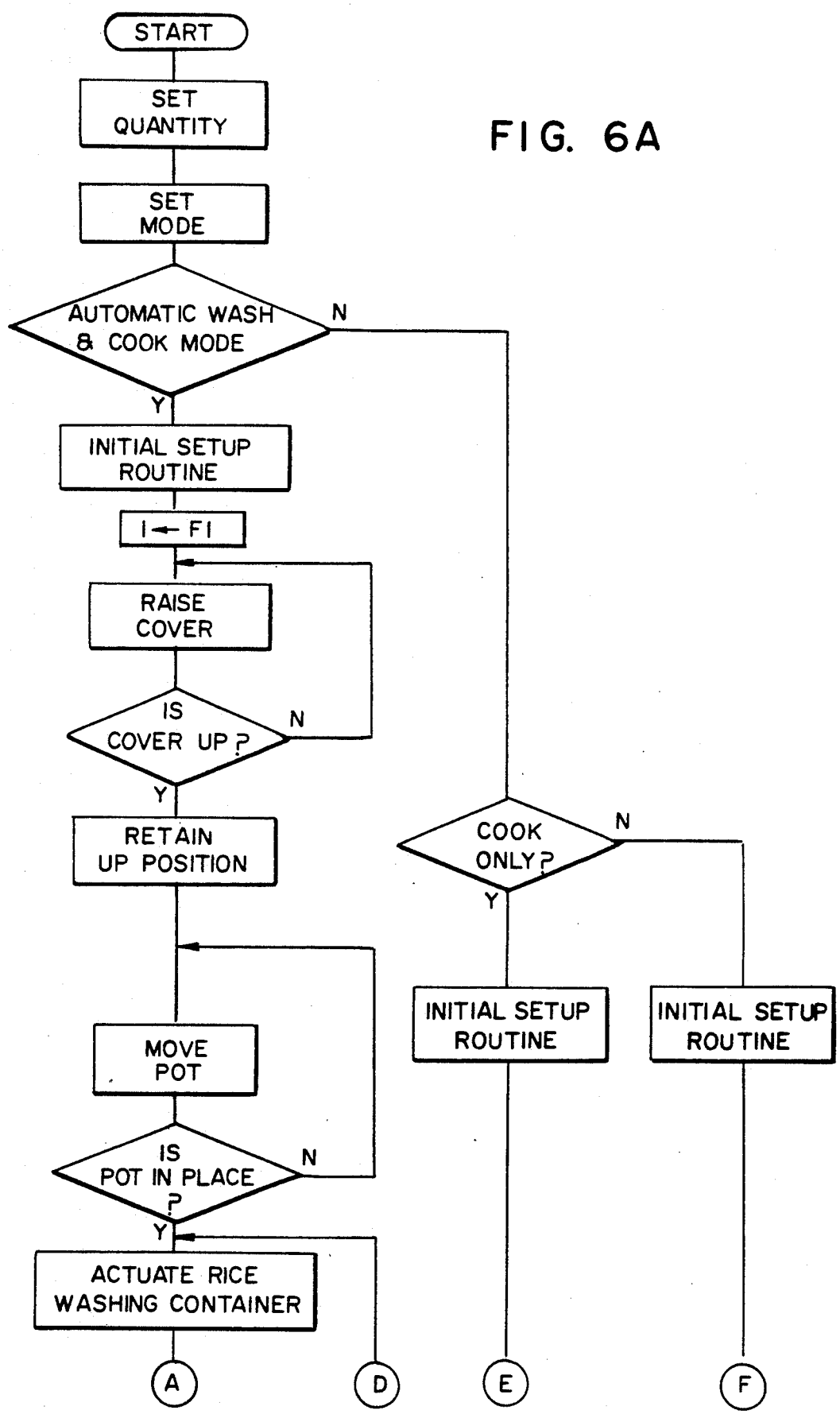
FIGS. 6A through 6E are a continuous flow diagram of the operation of the rice cooker.
Figure 6B:
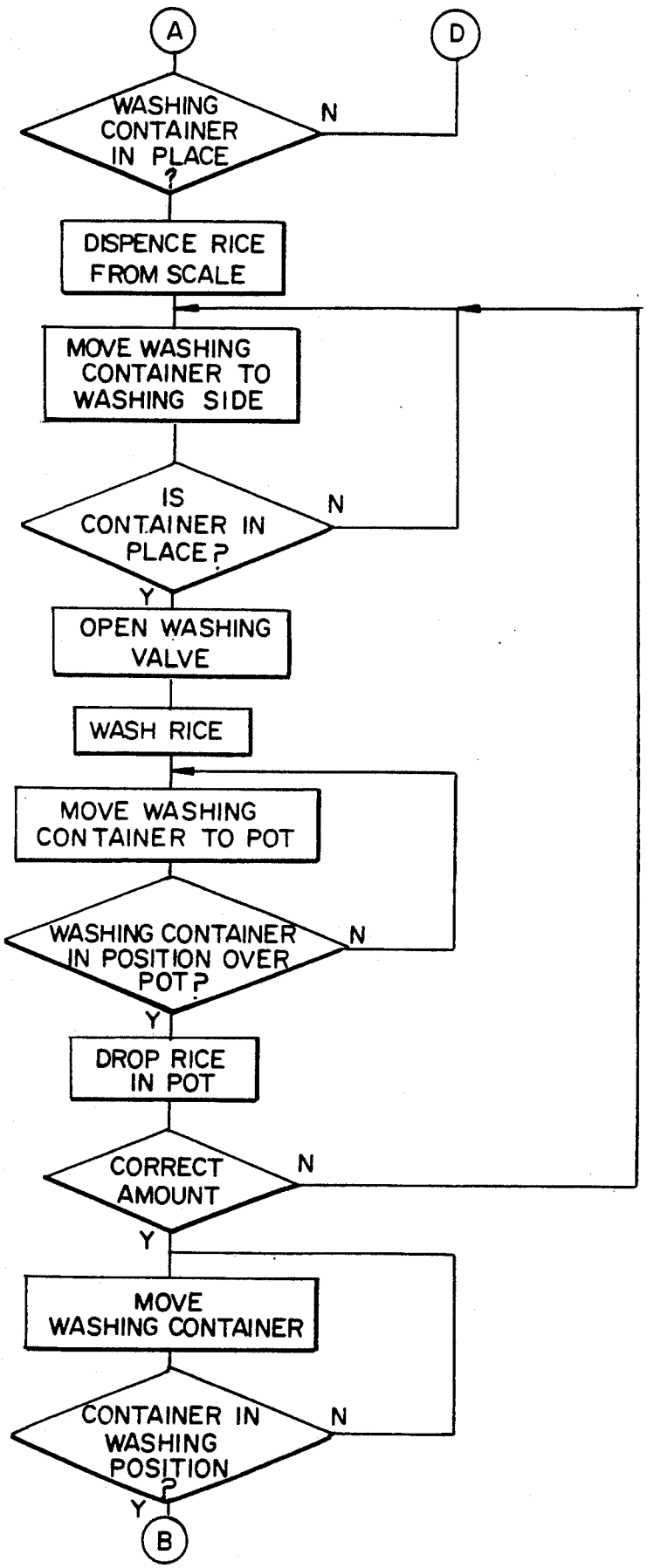
Figure 6C:
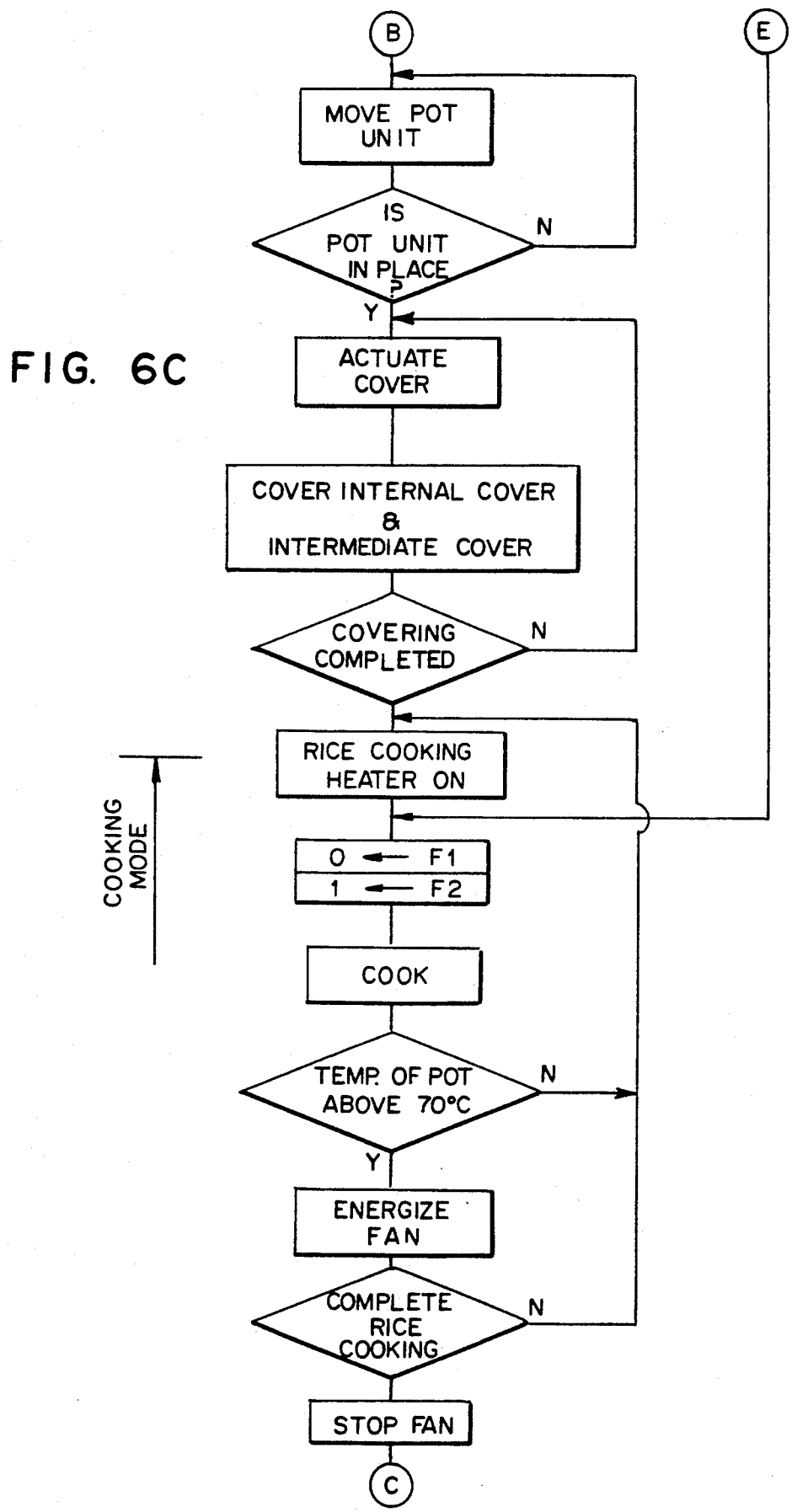
Figure 6D:
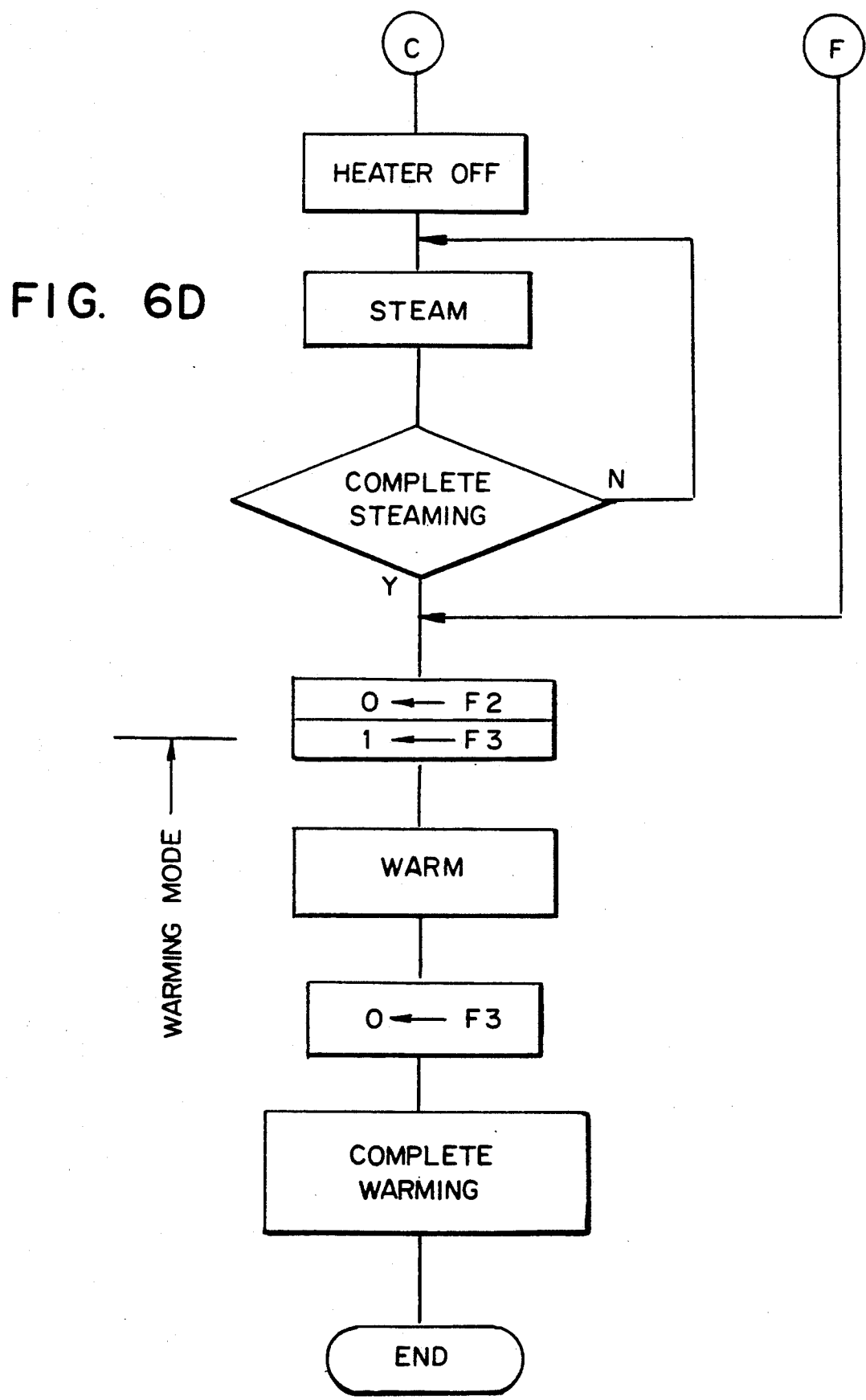
Figure 6E:
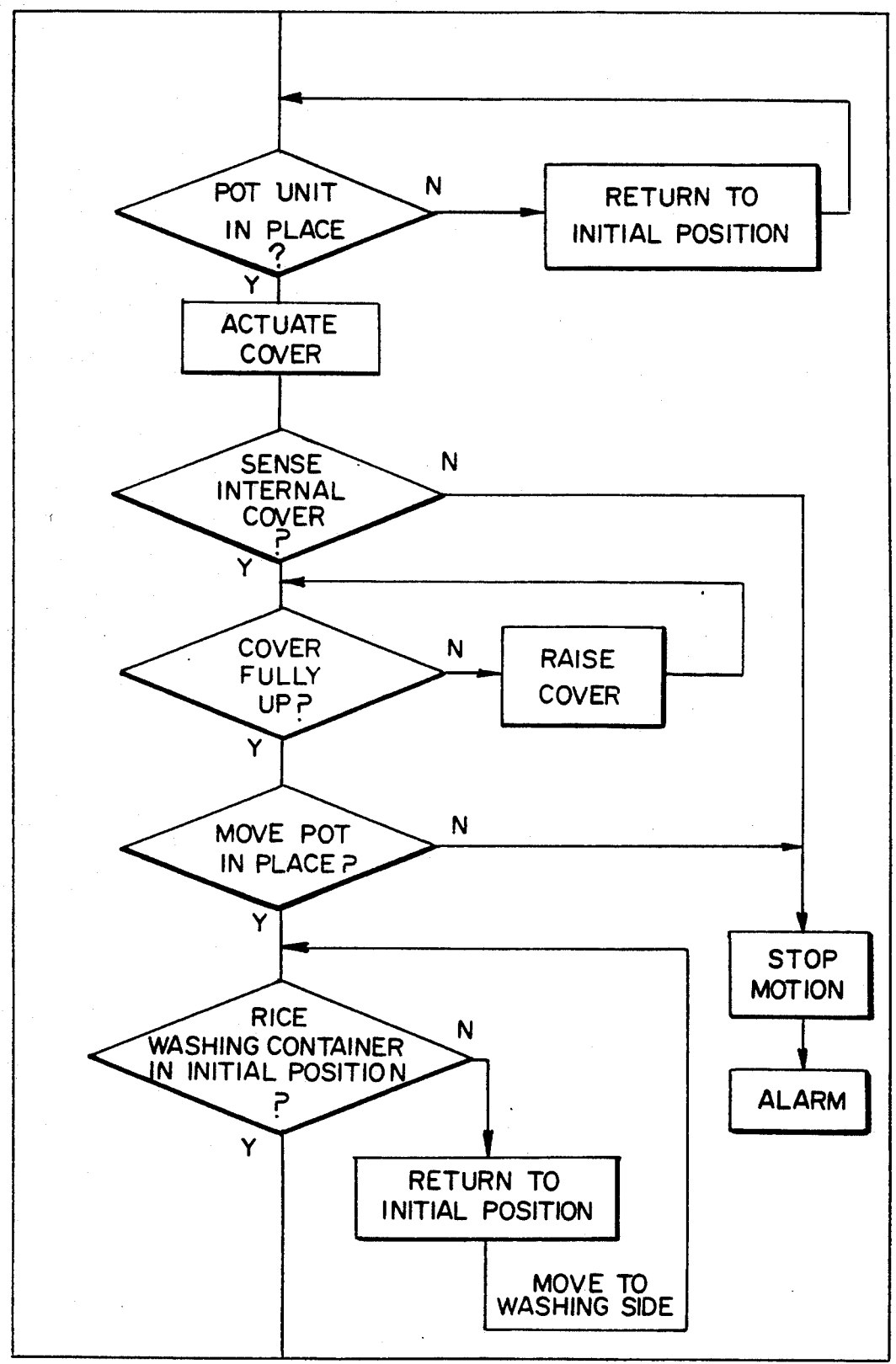

Referring now also to FIG. 5, when removable pot 24 is in place, its weight presses down on sensor 21 and a rocker assembly 25, to which it is connected. Rocker assembly 25 includes a rocker 25a that is pivoted to platform 17 at a pivot 25b. When pot sensor 21 is depressed by the weight of pot 24, rocker 25a closes a sensor switch 26, which is mounted on outer frame 19. Sensor switch 26 prevents the heating elements from heating heat plate 22 when removable pot 24 is removed from pot holding assembly 20.

Returning now to FIG. 2, an inner cover 27 covers the top of removable pot 14. An intermediate cover 28 is disposed over inner cover 27. A knob 30 abuts the upper surface of intermediate cover 28. A projection 29 extends downward through intermediate cover 28 and engages an opening 27a in inner cover 27 to join these covers together.

Figure 4:
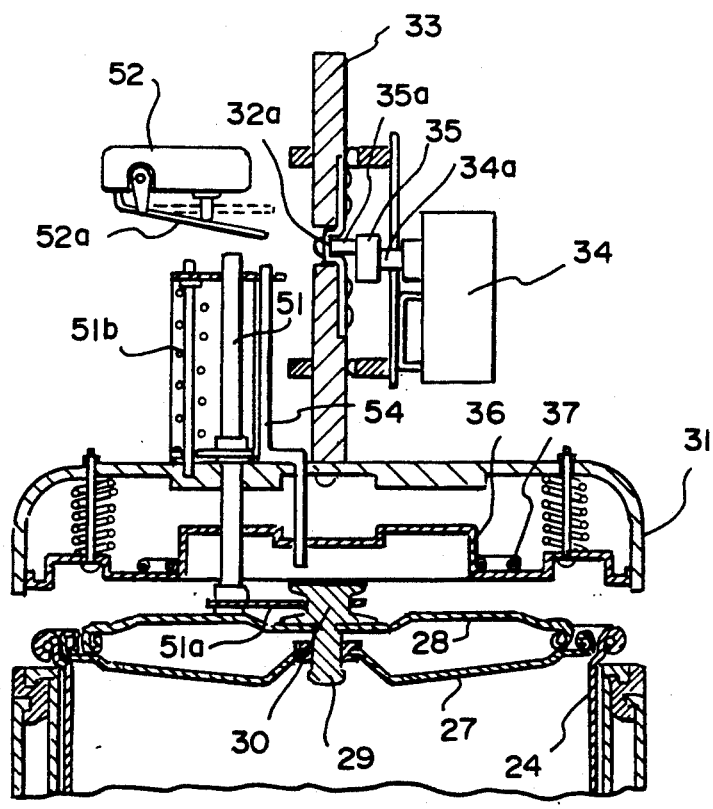
FIG. 4 is the same as FIG. 3 showing the pot cover assembly in an open position.

An upper pot cover assembly 31 is disposed above cooking pot assembly 18 on a drive rod 32 controlled by a operator 33. Cover operator 33 raises and lowers the upper pot cover assembly 31 to cover and uncover pot holding assembly 20 as required during operation. Cover operator 33 and upper pot cover assembly 31 are shown in their lowered, or closed, positions in FIG. 3, and in intermediate positions in FIG. 4.

Cover operator 33 is made up of a drive motor 34 having a shaft 34a engaging an eccentric drive bar 35. A drive pin 35a on drive bar 35 engages a nook 32a in drive rod 32.

Upper cover assembly 31 includes a heated pressure plate 36 having heating elements 37 therein. Pressure relief springs 38 urge heated pressure plate 36 downward in the closed position shown in FIG. 3, while providing resilience to permit excess steam pressure to be vented from removable pot 24 during cooking. In combination, these elements provide a heated and pressurized seal for removable pot 24.

An inner cover lifter 51 includes a hook projection 51a thereon which engages and holds knob 30. Inner cover lifter 51 is resiliently urged in the upward direction by a coil spring 51b. A cover sensing rod 54 projects downward through upper pot cover assembly and heated pressure plate 36. An upper end of cover sensing rod 54 is positioned to contact an actuating leaf 52a of a cover sensing switch 52 when upper pot cover assembly is in its fully downward and closed position.

In the fully closed position shown in FIG. 2, knob 30 presses cover sensing rod 54 upward into actuating contact with cover sensing switch. It will be noted that eccentric drive bar 35 is rotated into the position placing drive pin 35a in its lowermost position. The engagement of drive pin 35a in nook 32a moves drive rod 32 to its lowest position, thus forcing upper pot cover assembly into the closed position.

Figure 10:
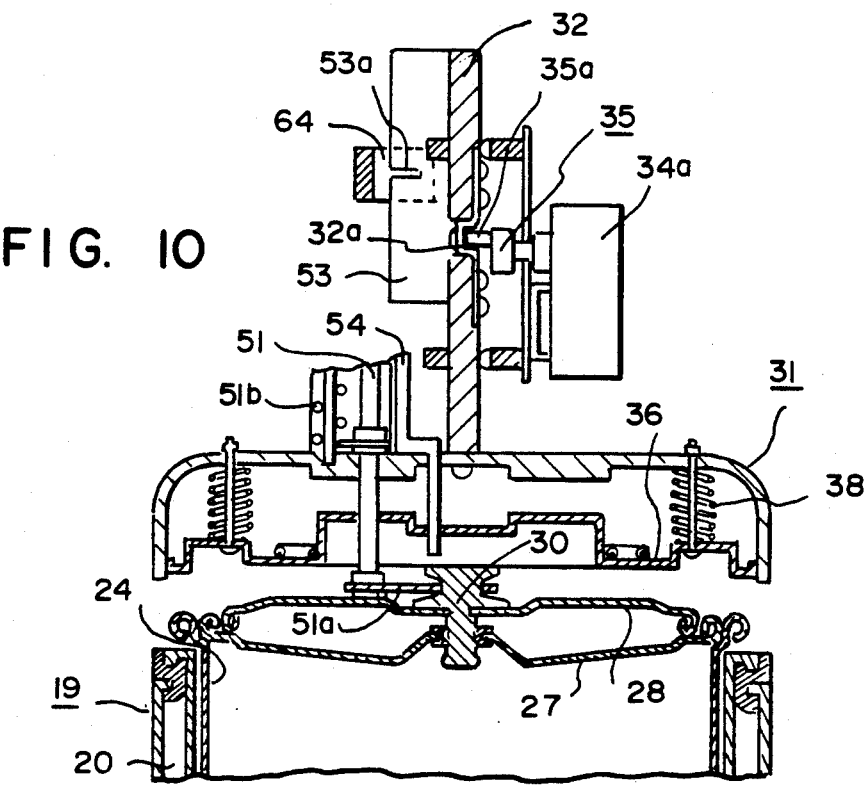
FIG. 10 is an enlarged cross section of the pot cover assembly shown in FIG. 9 in a partially open position.

Referring now to FIG. 10, the apparatus is shown in an intermediate position in which eccentric drive bar 35 is rotated into a position in which drive pin 35a is at about the same level as shaft 34a. In this position, knob 30 is lowered out of contact with the end of cover sensing rod 54, whereby cover sensing switch 52 (FIG. 2) is deactivated. Although upper pot cover assembly 31 has been moved upward from its fully closed position, inner cover 27 and intermediate cover 28 remain in contact with the rim of removable pot 24 as a result of the downward urging of pressure relief springs 39 on heated pressure plate 36.

Figure 11:
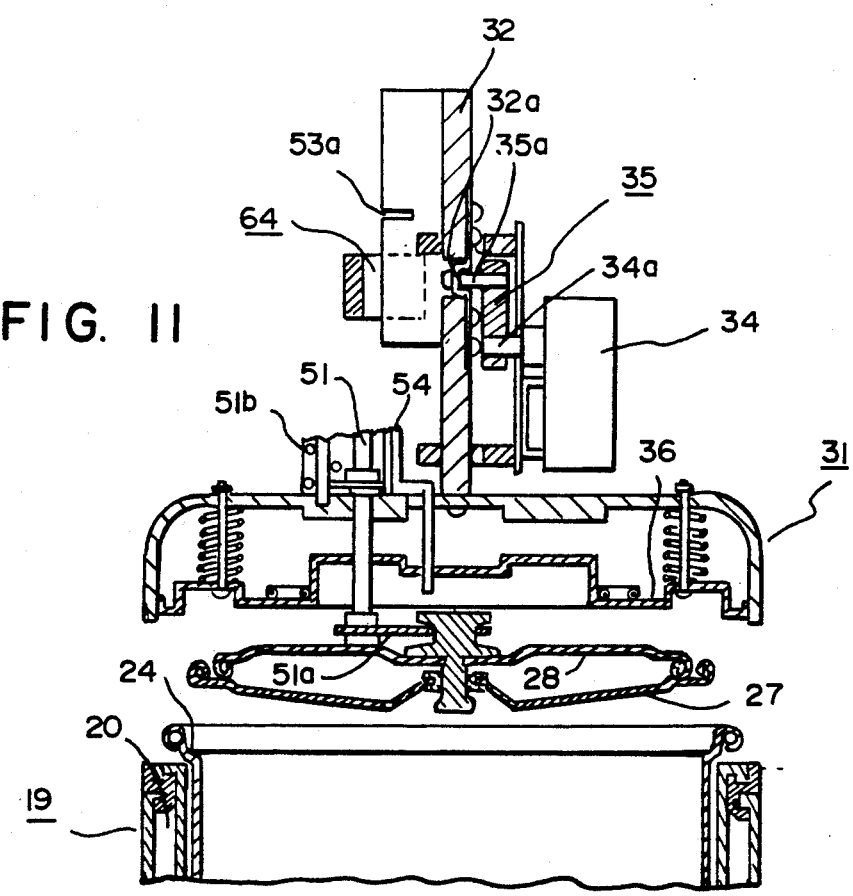
FIG. 11 is an enlarged fragmentary cross section of the pot cover shown in FIG. 9 in a fully open position.

Referring now to FIG. 11, showing the apparatus in the fully opened position, eccentric drive bar 35 is rotated by drive motor 34 into a position that places drive pin 35a in its uppermost position. Engagement of drive pin 35a with nook 32a elevates drive rod 32 to its upper limit. Hook projection 51a raises knob 30, thereby raising inner cover 27 and intermediate cover 28 clear of removable pot 24.

Figure 9:
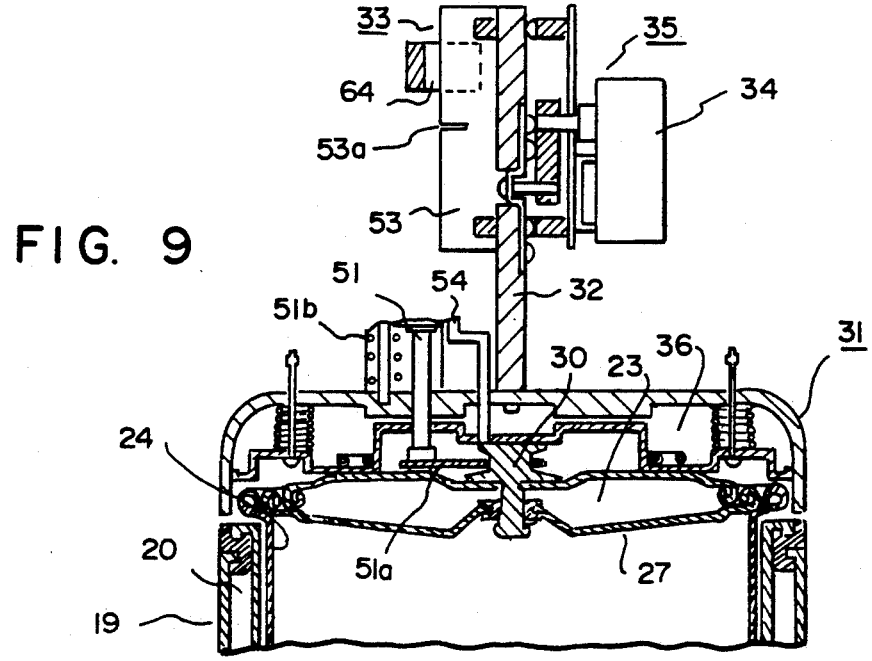
FIG. 9 is an enlarged fragmentary cross section of the pot cover assembly.

Referring now to FIGS. 9, 10, and 11, a notched blocking plate 53 is attached to move with drive rod 32. A photocell 64 is affixed to the wall of rice cooker 10, positioned behind notched blocking plate 53. A notch 53a in notched blocking plate 53 permits light to enter photocell 64 only in the intermediate open position shown in FIG. 10. At all other positions of drive rod 32, and of upper pot cover assembly 31, notched blocking plate 53 blocks light from reaching photocell 64. In this manner, photocell 64 detects notch 53a on notched blocking plate 53 to provide an indication when upper pot cover assembly 31 is in its intermediate position as shown in FIG. 10.

Returning now to FIG. 2, a storage hopper 55 is disposed at the top of rice cooker 10. A cover 15 provides access to storage hopper 55. Hopper 55 stores and dispenses raw, unwashed rice to the cooker. A scale 56, at the bottom of hopper 55 measures out selected quantities of rice to be cooked.

A water jet housing 60 for washing the rice is mounted on the wall of rice cooker. A hose 61 and nozzle 62 deliver water for washing rice.

A washer container 59, having a washer container drive 57 and a washer drive motor 58, is supported on the wall of rice cooker 10 in a hinged manner that permits washer container 59 to be swung into a first position, shown in two-dash line, under the scale 56 where it may be loaded with a quantity of unwashed rice. Alternatively, washer container 59 may be swung under water jet housing to receive water from nozzle 62.

For loading removable pot 24, cooking pot assembly 18 is moved along tracks 16 until removable pot 24 is positioned below scale 56. Washed rice, which may have been prepared in the manner described above, is fed from washer container 59 into removable pot 24. Then, cooking pot assembly 18 is returned along tracks 16 under upper pot cover assembly 31, where it is sealed in the manner previously described.

Alternatively, previously washed rice may be loaded into hopper 55. A measured quantity of the washed rice may be fed directly from scale 56 into removable pot 24 placed thereunder. The washed rice is cooked in the manner described. As a further alternative, washed and precooked rice may be fed to removable pot for reheating.

The operation of the present invention in its various modes will be explained below in reference to FIGS. 2 through 11.

For fully automatic mode operation, drive rod 32 is driven to its intermediate position shown in FIG. 10. Notch 53a and photocell 64 are used to ensure the correct vertical positioning of drive rod 32. The user inserts an empty removable pot 24, with inner cover 27 and intermediate cover 28 in place, into pot holding assembly 20 of pot assembly 18. Then, the user pushes drawer panel 13 with platform 17 and the attached pot assembly 18 inward. The intermediate position of drive rod 33 aligns hook projection 51a with a groove in knob 30. As removable pot 24 becomes aligned, latch hook 49 engages opening 17a on the platform 17 (FIG. 8) locking it in place. The user presses on/off switch 46, sets the quantity of rice to be cooked using quantity select control 39, and presses the automatic mode select pushbutton 41. The cooker then initiates operation by performing a preliminary checkout and setup routine to assure that the conditions required for operation, as shown in FIG. 2, are present.

These conditions are that platform 17 is latched in place and is holding drawer sensing switch 47 closed, a removable cooking pot 24 is positioned in pot holding assembly 20 and removable cooking pot 24 is covered by inner and intermediate pot covers 27, 28. The cooker also assures that the rice washer container 59 is in its start position under water jet assembly 60. The steps of the preliminary checkout and setup and operating routines are described below with respect to FIGS. 6A through 6H.

When a removable cooking pot 24, shown in FIG. 2, is in place in pot holding assembly 20, pot sensor 21 is pushed down against rocker 25a of rocker assembly 25, thereby closing sensor switch 26. If a removable cooking pot is absent, sensor switch 26 remains open, causing an alarm to be sounded and operation to be stopped. When the weight of a removable pot 24 is sensed, drive motor 34 and pot cover operator 33 move drive rod 32 down, thereby lowering upper pot cover assembly 31 onto cooking pot assembly 18. When the both inner and intermediate covers 27, 28 are in place, cover sensing rod 54 is urged upward by knob 30. This closes cover sensing switch 52 as pot cover assembly 31 continues to be lowered. This operation tests for the presence of inner and intermediate covers 27, 28.

If inner and intermediate covers 27, 28 are missing, sensing rod 54 is not urged upward, and cover sensing switch 52 remains open causing an alarm to be sounded and operation to be stopped. If inner and intermediate covers 27, 28 are in place, rice cooker 10 senses the position of washer container 59. If washer container 59 is not under water jet housing 60, washer drive motor 58 and washer container drive 57 rotate washer container 59 to its position under water jet housing 60.

When the checkout and setup routine is completed, and automatic rice loading is initiated, cover operator 33 lifts upper pot cover assembly 31, together with inner and intermediate covers 27 and 28, away from pot assembly 18. Inner and intermediate covers are lifted by hook projection 51a of inner cover lifter 51, which engages knob 30. Cooking pot assembly 18 is then moved along the track 16 to a position under rice scale 56. Also, washer drive motor 58 and washer container drive 57 rotate washer container 59 under the rice scale 56. A quantity of rice, measured by scale 56, is dropped into washer container 59, which is then rotated back to its position under water jet housing 60. Water nozzle 62 directs water into washer container 59. When washing of the rice is complete, washer container 59 is returned to a position over pot assembly 18 to drop the washed rice and cooking water into removable cooking pot 24. This cycle may be repeated a number of times to load any desired quantity of rice into removable cooking pot 24. In one embodiment of the invention, five loading cycles are used to load removable cooking pot 24.

At the completion of the rice loading, washer container 59 is rotated into its position under water jet housing 60 and cooking pot assembly 18 is moved under upper pot cover assembly 31. Upper pot cover assembly 31, together with inner cover 27 and intermediate cover 28, is now lowered onto pot assembly 18. Cooking heat is applied to heat plate 22 by heating elements 23 and to upper cover assembly 31 by heating element 37. When the temperature of removable cooking pot 24 exceeds 70 degrees C., a fan (not shown) is energized to exhaust steam from cooker enclosure 11. At the completion of the cooking period, the temperature of heater elements 23 and 37 is reduced to a keep-warm level. The fan is then turned off.

When removable cooking pot 24 is preloaded with washed rice and water, and the cook and keep-warm only mode is initiated by pressing pushbutton 42 of mode selector 40, rice cooker 10 performs the same checkout and setup procedure as for the fully automatic mode. This procedure assures that removable pot 24 and its inner cover 27 and intermediate cover 28 are in place. This procedure also assures that washer container 59 is in its home position and cannot drop water and rice into enclosure 11.

At the completion of the checkout and setup procedure, automatic rice weighing, washing, and loading routines are bypassed and the cooker continues the process with rice cooking as described above.

When removable pot 24 is loaded with cooked rice and only rice warming is required, the keep-warm mode is initiated by pressing pushbutton 43 of mode selector 40. In this mode, only rice warming is carried out following the initial checkout and setup procedure.

Removal of removable pot 24 is discussed with reference to FIGS. 11 through 15. When removable pot 24 is to be removed, the user presses pot release pushbutton 45 on control panel 12 of rice cooker 10, shown on FIG. 1. This causes upper pot cover assembly 31 to be raised to the intermediate position showing FIG. 10 by drive motor 32 through operator 33. When 53a notch in notched blocking plate 53 is detected by photo cell 64, indicating that upper pot cover 31 is in the intermediate position, solenoid 48 is energized to release latch 49. The user pulls out drawer panel 13. This disengages hook projection 51a of inner cover lifter 51 from knob 30 to permit cooking pot assembly 18 to move outward on platform 17 without damage to cooking pot assembly 18, upper cover assembly 31 or pot cover operator 33. With drawer panel 13 pulled out, the user can lift removable pot 24 out of pot assembly 18. Drawer panel 13 is pulled out when upper pot cover assembly 31 in the intermediate position because, as shown in FIG. 10, this position places upper pot cover assembly 31 clear of cooking pot assembly 18, but leaves inner cover 27 and intermediate cover 28 in place on removable pot 24. This prevents steam from being released as it would be if these covers were lifted clear of removable pot 24 as shown in FIG. 11.

The above, and other objects, features and advantages of the present invention will become apparent from the following description read in conjunction with the accompanying drawings, in which like reference numerals designate the same elements.

What is claimed is:

1. A rice cooker comprising:
   means for weighing a predetermined quantity of rice;
   means for washing said predetermined quantity of rice to produce washed rice;
   means for cooking said washed rice;
   means for keeping rice warm;
   automatic control means for operating said means for weighing, means for washing and said means for cooking;
   means, responsive to said control means, for bypassing said means for weighing and said means for washing, whereby rice that has been washed elsewhere can be cooked; and
   means, responsive to said control means for bypassing said means for weighing, said means for washing, and said means for cooking, whereby rice that has been washed and cooked elsewhere can be kept warm.

2. A rice cooker according to claim 1, further comprising:
   automatic means, responsive to said control means, for performing an initialization routine to determine that said rice cooker is in operating condition.

3. A rice cooker according to claim 2, further comprising:
   said means for washing including a washer container;
   means for moving said washer container between a first position, where it is effective to receive unwashed rice, to a second position where said unwashed rice is washed; and
   said automatic means for performing an initialization routine including means for determining that said washer container is in said second position before permitting operation to proceed.

4. A rice cooker according to claim 2, further comprising:
   said rice cooker including a removable pot;
   at least one cover for said removable pot; and
   said automatic means for performing an initialization routine including means for determining that said at least one cover is in place on said removable pot before permitting operation to proceed.

5. A rice cooker according to claim 2, wherein said automatic means for performing an initialization routine includes means for sensing the presence of said removable pot before permitting operation to proceed.

6. A rice cooker according to claim 1, further comprising:
   a cooking pot assembly;
   means for entering said cooking pot assembly into a remainder of said rice cooker; and
   means for latching said cooking pot assembly in said remainder until a predetermined condition exists.

* * * * *